(12) United States Patent
Kim et al.

(10) Patent No.: US 10,035,867 B2
(45) Date of Patent: Jul. 31, 2018

(54) METHOD FOR PREPARING POLYBUTENE BY USING CATALYST CONTAINING N-PROPANOL

(71) Applicant: DAELIM INDUSTRIAL CO., LTD., Seoul (KR)

(72) Inventors: Myeong Seok Kim, Daejeon (KR); Min Sup Park, Daejeon (KR); Hyung Jae Seo, Daejeon (KR); Se Hyun Lee, Daejeon (KR)

(73) Assignee: Daelim Industrial Co., Ltd., Seoul (KR)

( * ) Notice: Subject to any disclaimer, the term of this patent is extended or adjusted under 35 U.S.C. 154(b) by 0 days.

(21) Appl. No.: 15/316,936

(22) PCT Filed: Jun. 18, 2015

(86) PCT No.: PCT/KR2015/006174
§ 371 (c)(1),
(2) Date: Dec. 7, 2016

(87) PCT Pub. No.: WO2015/194874
PCT Pub. Date: Dec. 23, 2015

(65) Prior Publication Data
US 2017/0114164 A1    Apr. 27, 2017

(30) Foreign Application Priority Data
Jun. 18, 2014 (KR) ........................ 10-2014-0074124

(51) Int. Cl.
*C08F 210/10* (2006.01)
(52) U.S. Cl.
CPC ........ *C08F 210/10* (2013.01); *C08F 2410/04* (2013.01); *C08F 2500/04* (2013.01)

(58) Field of Classification Search
CPC . C08F 210/10; C08F 2410/04; C08F 2500/04
See application file for complete search history.

(56) References Cited

U.S. PATENT DOCUMENTS

| 4,605,808 A | 8/1986 | Samson |
| 5,068,490 A | 11/1991 | Eaton |

(Continued)

FOREIGN PATENT DOCUMENTS

| KR | 10-0787851 | * 12/2007 | ............. C08L 23/20 |
| KR | 10-0787851 B1 | 12/2007 | |
| KR | 1020130115624 A | 10/2013 | |

OTHER PUBLICATIONS

International Preliminary Report on Patentability, Form PCT/IB/373 and Written Opinion of the International Searching Authority, Form PCT/ISA/237 of PCT/KR2015/006174 dated Sep. 14, 2015, with English translation.

(Continued)

*Primary Examiner* — Robert Harlan
(74) *Attorney, Agent, or Firm* — Nath, Goldberg & Meyer; Tanya E. Harkins; Joshua B. Goldberg

(57) ABSTRACT

Disclosed a method for preparing polybutene by using a catalyst including normal propanol, wherein the polybutene has 40 to 70% of vinylidene content and 10% or more of tetra-substituted double bond content by using a complex catalyst including normal propanol as a cocatalyst and a main catalyst such as boron trifluoride. The method comprises: introducing, to a raw reaction material including 10 wt % or more of isobutene, a complex catalyst including normal propanol as a cocatalyst and boron trifluoride as a main catalyst; and polymerizing the raw reaction material at a reaction temperature of −33 to 33° C. under a reaction pressure of 3 to 50 kg/cm², wherein the vinylidene content is adjusted by adjusting the reaction temperature.

5 Claims, 1 Drawing Sheet

(56) References Cited

U.S. PATENT DOCUMENTS

| | | | |
|---|---|---|---|
| 5,191,044 A | 3/1993 | Rath et al. |
| 5,408,018 A | 4/1995 | Rath |
| 5,962,604 A | 10/1999 | Rath |
| 7,037,999 B2 | 5/2006 | Baxter, Jr. et al. |

OTHER PUBLICATIONS

Supplementary European Search Report dated Jan. 18, 2018 for European patent application No. EP 1581096.4.

* cited by examiner

METHOD FOR PREPARING POLYBUTENE BY USING CATALYST CONTAINING N-PROPANOL

FIELD OF THE INVENTION

The present disclosure relates to a method for preparing polybutene using a catalyst including normal propanol, and more particularly, to a method for preparing polybutene by using a catalyst including normal propanol, wherein the polybutene has 40 to 70% of vinylidene content and 10% or more of tetra-substituted double bond content by using a complex catalyst including normal propanol as a cocatalyst and a main catalyst such as boron trifluoride.

BACKGROUND OF THE INVENTION

Polybutene is generally prepared by polymerizing an olefin component having a carbon number of 4 (C4) derived during the naphtha degrading process using a Friedel-Craft type catalyst and has a number average molecular weight of about 300 to 5,000. Among the C4 raw materials, remainder after 1,3-butadiene extraction is called C4 raffinate-1 and includes paraffin such as isobutane, normalbutane and olefin such as 1-butene, 2-butene, and isobutene. Among these, the isobutene content is about 30 to 50 wt %. The C4 raffinate-1 is mostly used for preparation of polybutene or methyl-t-butyl ether (MTBE) which is an octane number enhancer. Since isobutene, among the olefin components of C4 raffinate-1, has the highest reactivity, the produced polybutene is mostly composed of the isobutene unit. Further, polybutene may be prepared from high purity isobutene or butane-butene oil (B-B oil), i.e. a C4 mixture derived during the crude oil refining process.

As the molecular weight increases, the viscosity of polybutene increases. Polybutene has a viscosity of about 4 to 40,000 cSt (centi-stocks) at 100° C. In addition, polybutene is pyrolyzed at a temperature of 300° C. or above without residues. Further, polybutene has a branched chain alkyl structure, thereby having good solubility to lubricating oil or fuel. Therefore, the polybutene is added to engine oil and used as an anti-scuff agent or a viscosity index improver, or mixed with fuel for an internal combustion engine of automobiles and used as a clarificant.

Typically, polybutene is mostly used for a gluing agent, an adhesive, and insulating oil so that products having high reactivity are not preferred. However, recently, a polar group is introduced to polybutene to thereby be used as a fuel clarificant or lubricating oil additive, and thus need for polybutene having high reactivity is gradually increased. Among products which is obtainable by introducing a polar group, the mostly well known and the most often used product is polyisobutenyl succinic anhydride (PIBSA) which is prepared by reacting polybutene with maleic anhydride. Most of fuel clarificants or lubricating oil additives are prepared by using the PIBSA as an intermediate. Additionally, products obtained by introducing a polar group include phenols and alkyl phenols such as polybutenylphenol prepared through manich reaction of mid-reactive polybutene (Mid-Range Vinylidene Content Polyisobutylene (MVPB)) which has 40 to 70% of vinylidene content.

When the double bond of polybutene used for PIBSA preparation is located at the terminal of polybutene, PIBSA is obtained at high yield. However, when the double bound is located at the internal of polybutene, and in particular, the number of substituted alkyl group at the double bound is high, PIBSA yield is decreased due to low reactivity caused by steric hindrance. Producing double bond at the terminal of the molecule and terminating polymerization indicate production of a compound opposite to general chemical reaction theory. The most effective way to prepare highly reactive polybutene (HRPB) having a vinylidene content of more than 70%, which is difficult to produce, is to use a complex catalyst in which a catalyst and cocatalyst are mixed.

For preparation of highly reactive polybutene and mid-reactive polybutene, boron trifluoride, as a main catalyst, and alcohol, as a cocatalyst are typically used. For mid-reactive polybutene, when polymerization is performed by using mix C4 including isobutene as a raw material and methanol or ethanol as a cocatalyst, mid-reactive polybutene is prepared with remarkably decreased efficiency. When polymerization is performed by increasing the isobutene conversion rate, there is a problem in which a large amount of light polymer (LP) in addition to the main product, i.e. mid-reactive polybutene, is generated.

Before highly reactive polybutene is used, PIBSA is prepared with normal polybutene, i.e. non-reactive polybutene (conventional polyisobutylene, ConPB, which has a vinylidene content of less than 40%). One method to increase reactivity of non-reactive polybutene is that polybutene is chlorinated through chlorination reaction using chlorine gas, and then reacted to maleic anhydride to prepare PIBSA so that the final product is achieved. However, this process requires high cost for preventing corrosion of a reactor, and a large amount of basic solution should be used to neutralize unreacted chlorine gas, so that this process is undesirable in terms of economical and environmental aspects. Moreover, when PIBSA having an increased chlorine content is used as a fuel additive, there are problems such as corrosion of internal combustion engine including an engine of automobile and discharge of chlorine through exhaust, so that an improvement is made by preparing a lubricating oil additive and fuel clarificant by using highly reactive polybutene.

Highly reactive polybutene is advantageous when the vinylidene content is high. The reason will be described with reference to typically known technique. At first, highly reactive polybutene is subjected to Ene reaction (or Alder-Ene reaction) with maleic anhydride at about 230° C. PIBSA produced by the reaction is reacted to alkyl amine to produce polyisobutenyl succinic imide (PIBSI). Then, the PIBSI is mixed with a diluent having a high boiling point to prepare a fuel clarificant and a lubricating oil additive. Since the vinylidene content of the highly reactive polybutene increases the PIBSA yield, as the vinylidene content increases, the quality increases. Consequently, the PIBSA yield is increased. Herein, high PIBSA yield means that the PIBSI yield is also high, which indicates that an active ingredient which acts as a clarificant is high. Therefore, it can be found that preparation of highly reactive polybutene having a high vinylidene content is important.

Evolution from non-reactive polybutene to highly reactive polybutene, which is used in a lubricating oil additive or fuel clarificant, improves the process by eliminating a step of reaction and is environmental friendly by excluding toxic chlorine gas ($Cl_2$ gas). Therefore, to increase reactivity of polybutene per se, a study has been conducted to prepare highly reactive polybutene including 70% or more, and more preferably 85% or more vinylidene without chlorine which causes corrosion of a device. As a Friedel-Crafts type catalyst for preparing the highly reactive polybutene, boron trifluoride ($BF_3$), which allows highly reactive polybutene having a relatively high vinylidene content than other lewis acids, is generally used. U.S. Pat. Nos. 4,605,808, 5,068,490, 5,191,044, 5,408,018, and 5,962,604 disclose a method for capable of preparing highly reactive polybutene having 70% or more, and preferably 80% or more of vinylidene by using boron trifluoride or a complex compound of boron trifluoride with a cocatalyst of water, ether, and alcohol.

In consideration of the documents described above, the molecular weight of the polymeric product has close relationship with the reactivity. In other word, when a complex catalyst having a low molar ratio of cocatalyst/main catalyst having high reactivity is used, a product having a high molecular weight may be produced. When a molar ratio of a complex catalyst is gradually increased, the activity of the catalyst is decreased, so that a product having a low molecular weight may be produced. In addition, it has been indirectly suggested that highly reactive polybutene including a high vinylidene content may be prepared by using a complex catalyst having declined reactivity due to a cocatalyst such as alcohol, and ether, thereby increasing reaction selectivity of isobutene.

U.S. Pat. No. 5,068,490 discloses a method for preparing polybutene having a vinylidene content of 80% or more by using, as a catalyst, a complex including boron trifluoride and ether having at least one tertiary alkyl group. The method has advantages in that isomerization is low even for long term contact. In the examples, it has been indicated that, when isopropyl t-butylether having both secondary and tertiary alkyl groups is used, the most excellent result is shown, but the isopropyl t-butylether is expensive and is not produced for conventional purpose so that self preparation is required. U.S. Pat. Nos. 5,408,018 and 5,962,604 disclose a method for preparing polybutene having 80% or more of vinylidene and low degree of molecular weight distribution by using, as a catalyst, a complex of secondary alcohol and boron trifluoride. However, there are many limitations in the operation condition such that contact is maintained for a short period of 9 minutes or less at a temperature equal to or less than −10° C. for operation rate control. Therefore, to increase the vinylidene content, there are many disadvantages in terms of an economical aspect in that an isobutene law material having high purity should be used and preparation should be performed by using a catalyst having a decreased activity.

U.S. Pat. No. 7,037,999 B2 discloses a polybutene having a vinylidene content of less than 70% and including a double bond at tetra position less than 10%, and a process for preparing the same. However, there is no mention about advantages obtained by the double bond at tetra position and a method for efficiently preparing polybutene in an economical aspect. In addition, in examples, considering that polybutene is prepared with a low conversion rate, high price of isobutene having high purity is used, however, polybutene is prepared at low yield in this case and thus the method is not economical. Additionally, C4 raffinate-1 containing 1-butene, and 2-butene is used, the conversion rate should be decreased a lot to prepare polybutene including less than 10% of tetra-substituted double bond content.

Tetra-substituted double bound, which is a branched alkyl structure, has excellent compatibility with fuel of internal combustion engine and lubricating oil and relatively good heat stability and reactivity than vinylidene or tri-substituted double bond during halogenation or epoxification for preparing a lubricating oil additive or fuel additive, so that the tetra-substituted double bound may be efficiently used to fields requiring high yield.

In the presence of various raw materials such as C4 raffinate-1, and high purity isobutene, polymerization and preparation of polybutene including a desired vinylidene content is almost impossible due to various limiting factors. Generally, non-reactive polybutene prepared by using, as a catalyst, aluminum trichloride ($AlCl_3$) has a vinylidene content of 5 to 10%. Highly reactive polybutene prepared by using boron trifluoride ($BF_3$, main catalyst), a cocatalyst of alcohol, and auxiliary cocatalyst of ether has 70% or more of vinylidene. As long as preparing non-reactive polybutene, it is very difficult to adjust the vinylidene content in a range of 70% or less. Therefore, it is required a method capable of easily adjusting the vinylidene content and molecular weight at a high conversion rate.

SUMMARY OF THE INVENTION

Therefore, a purpose of the present invention is to provide a method for preparing polybutene using a catalyst including normal propanol, the method capable of preparing polybutene including 40 to 70% vinylidene irrespective of raw materials.

Another purpose of the present invention is to provide a method for preparing polybutene using a catalyst including normal propanol, the method capable of preparing polybutene including 10% or more of tetra-substituted double bond which has excellent compatibility and relatively good heat stability and reactivity than vinylidene and tri-substituted double bond.

Still other purpose of the present invention is to provide a complex catalyst including normal propanol (cocatalyst) and boron trifluoride (main catalyst), the catalyst being used for preparation of polybutene having a vinylidene content of 40 to 70% and 10% or more of tetra-substituted double bond content, and capable of adjusting the vinylidene content.

To achieve the purpose, the present invention provides a method for preparing polybutene having 40 to 70% of vinylidene content and 10% or more of tetra-substituted double bond content, the method including: introducing, to a raw reaction material including 10 wt % or more of isobutene, a complex catalyst including normal propanol as a cocatalyst and boron trifluoride as a main catalyst; and polymerizing the raw reaction material at a reaction temperature of −33 to 33° C. under a reaction pressure of 3 to 50 kg/cm², wherein the vinylidene content is adjusted by adjusting the reaction temperature.

A method for producing polybutene according to the present invention by using a catalyst containing n-propanol makes controlling molecular weight and vinylidene content be easy to produce the reactive polybutene with high conversion ratio and yield. The production of polybutene is economical since the content of vinylidene in the polybutene can be adjusted to 40 to 70% even if any raw material is supplied, such as a C4 mixture such as an economical C4 residue-1, an isobutene mixture, or a relatively expensive high-purity isobutene. Since polybutene of the present invention contains a tetra-substituted double bond of 10% or more, not only the compatibility with the fuel of the internal combustion engine and the lubricating oil, but also the thermal stability and the reactivity are improved.

DETAILED DESCRIPTION OF THE INVENTION

Hereinafter, the present invention will be described in more detail with reference to accompanying drawings.

Figure 1:
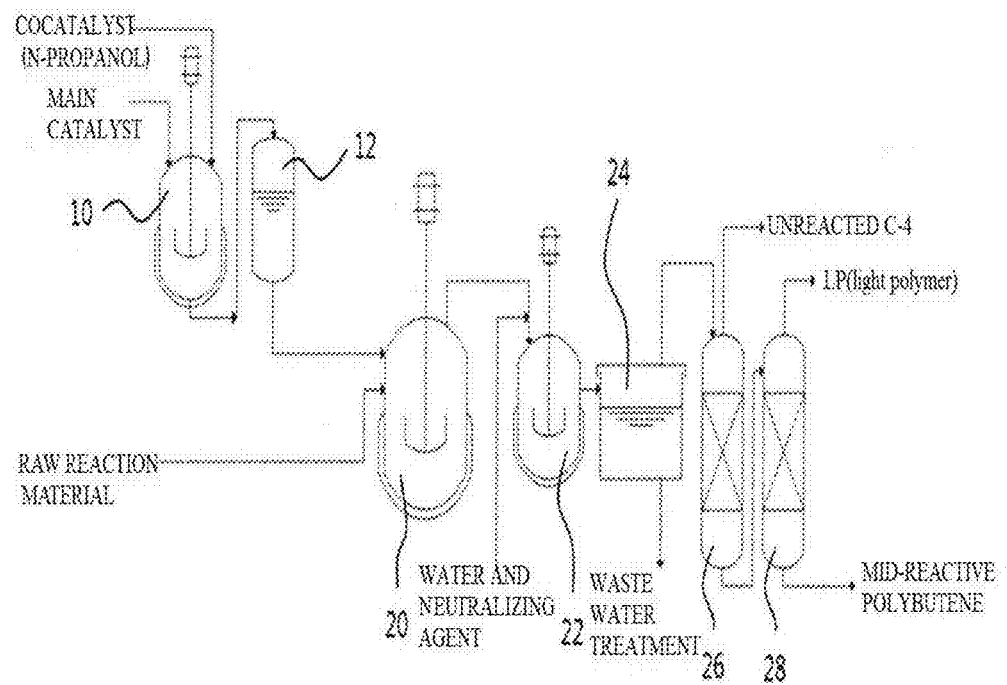
FIG. 1 is an image for illustrating a method for preparing polybutene by using a catalyst including normal propanol according to an embodiment of the present invention.

FIG. 1 is an image for illustrating a method for preparing polybutene by using a catalyst including normal propanol according to an embodiment of the present invention. FIG. 1 shows one of methods for preparing polybutene by using a catalyst including normal propanol, and does not include all features of the present invention. As shown in FIG. 1, to prepare polybutene by using a catalyst including normal propanol according to the present invention, a raw reaction material including 10 wt % or more of isobutene and a complex catalyst including normal propanol, as a cocatalyst, and boron trifluoride, as a main catalyst, are prepared.

The cocatalyst is essentially supplied for preparation of polybutene and acts as a proton ($H^+$) donor for initiation of reaction. As the cocatalyst, water ($H_2O$) or an alcohol compound having a carbon number of 1 to 4 may be typically used without limitation, however only normal propanol is used in the present invention. By adjusting input of the cocatalyst, a molar ratio of cocatalyst/main catalyst is adjusted so that reactivity of the complex catalyst may be increased or decreased. As a result, the molecular weight, vinylidene content and catalyst mileage and so forth may be adjusted.

As the main catalyst, lewis acids such as boron trifluoride, and aluminum trichloride, which is a typical friedel craft type catalyst, may be used as needed. Boron trifluoride having excellent ability to induce terminal vinylidene production, and advantageous in the conventional purpose is the most preferably used. When the boron trifluoride is used as the main catalyst, the content thereof is 0.02 to 1 parts by weight with respect to 100 parts by weight of isobutene.

A molar ratio of the cocatalyst/main catalyst included in the complex catalyst, for example, normal propanol/boron trifluoride is 1 to 2, preferably 1 to 1.8, and more preferably 1 to 1.5. When the molar ratio of normal propanol/boron trifluoride is less than 1, the complex catalyst may be modified. When the molar ratio is excessively high, i.e. above 2, reactivity becomes too low, so that it is difficult to adjust the vinylidene content and preparation cost may be increased.

For preparation of the complex catalyst, for example, preparation may be performed by introducing normal propanol, which is a cocatalyst, into a complex catalyst preparation device 10; and then introducing a main catalyst such as boron trifluoride for 2 to 6 hours, preferably 3 to 5 hours, and more preferably 3.5 to 4.5 hours bewaring of exothermic reaction, while maintaining a temperature of −20 to −5° C., preferably −15 to −7° C., and more preferably −10° C. to adjust the molar ratio of cocatalyst/main catalyst For the complex catalyst, as shown in FIG. 1, each of the cocatalyst and main catalyst is introduced to the complex catalyst preparation device 10. However, the main catalyst may be introduced to a cocatalyst introduction pipe coupled to the complex catalyst preparation device 10, or the cocatalyst and main catalyst may be introduced to a pipe for supplying a raw reaction material to a reactor 20. In other word, the method is not specifically limited as long as the cocatalyst and main catalyst may be mixed.

The raw reaction material includes 10 wt % or more, preferably 25 to 60 wt % of isobutene, and is, for example, C4 raffinate-1 which is a remainder after 1,3 butadiene extraction from a hydrocarbon mixture having a carbon number of 4 derived during the naphtha degrading process or crude oil refining process. In addition, a method of diluting pure isobutene with alkanes and using the diluent is also available. In that case, the isobutene concentration is preferably 25 to 60 wt % for proper polymerization of products.

Sequentially, the raw reaction material is polymerized for 5 to 100 minutes at a reaction temperature of −33 to 33° C. under a reaction pressure of 3 to 50 kg/cm², wherein the reaction temperature is adjusted to adjust the vinylidene content so that polybutene having 40 to 70% of vinylidene content and 10% or more of tetra-substituted double bond is prepared.

The polymerization should be performed in the rector 20 which maintains a reaction temperature of −33 to 33° C., preferably −30 to 30° C. and a reaction pressure of 3 to 50 kg/cm², preferably 3.5 to 10 kg/cm² for 5 to 100 minutes, preferably 10 to 45 minutes of retention time to allow the raw reaction material to be maintained at a liquid state. In addition, for appropriately adjusting terminal vinylidene, the isobutene conversion rate should become 80% or more, and preferably 90 to 99%.

When the vinylidene and molecular weight are determined through the polymerization, the vinylidene content may be adjusted by adjusting the reaction temperature during the polymerization as the following Formula 1.

$$1.2 \times |T| \leq \Delta V \leq 3 \times |T| \qquad \text{[Formula 1]}$$

Figure 2:
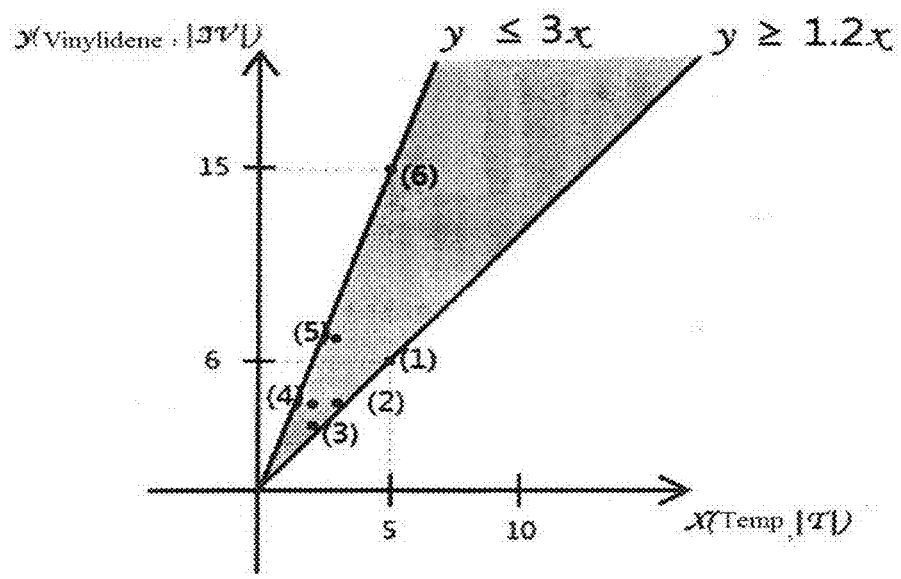
FIG. 2 is a graph showing relation between the vinylidene content and reaction temperature in the method for preparing polybutene according to an embodiment of the present invention.

Wherein, T represents a reaction temperature (−33° C.≤T≤33° C.); |T| represents variation of a reaction temperature (based on a reaction temperature of 0° C.); and ΔV represents variation of a vinylidene content. For example, when the reaction temperature is changed by 5° C., the vinylidene content is changed by 6 to 15%. FIG. 2 is a graph showing relation between the reaction temperature and vinylidene content in the method for preparing polybutene according to an embodiment of the present invention, and shows the result according to Formula 1.

The Formula 1 is applied in the case where normal propanol is used as a cocatalyst; the same raw reaction material is used; and the same molecular weight grade product is produced (the amount of used catalyst may vary depending on the raw reaction material and condition of the process).

The vinylidene content is measured through carbon-13 nuclear magnetic resonance (CNMR). Also, the vinylidene content may be measured through proton nuclear magnetic resonance (HNMR). For vinylidene of the present specification, a polybutene sample is dissolved by using deuterated chloroform ($CDCL_3$), as a nuclear magnetic resonance (NMR) reagent, placed in a nuclear magnetic resonance (NMR) tube and scanned 1,024 times by using a magnetic resonance image device (Bruker Biospin AVANCE III 500 (500 MHz)) at a temperature of 27° C. Then, peaks in an olefin region are integrated to be used as a total value. Then, an integrated value of alpha vinylidene peaks at 135.5 ppm, and 143.5 ppm is divided by the total olefin integrated value to obtain the content.

$$\text{Alpha Vinylidene, \%} = \frac{\text{Alpha Vinylidene Area}}{\text{Total Olefin Area}} * 100$$

Depending on a device specification (MHz), molecular weight, and sample quantity, the number of scan (analysis time) may vary. In addition, analysis may be performed by introducing an internal standard material (1,3,5-tri-tert-butylbenzene).

In sequence, when the polymerization is terminated, polybutene having 40 to 70% vinylidene at the terminal, among the whole double bond of polybutene, and 10% or more of tetra-substituted double bond which has the number of an alkyl group substituted at the double bond is 4, i.e., mid-reactive polybutene is prepared. The number average molecular weight (Mn) of the mid-reactive polybutene is 300 to 5,000, preferably 400 to 2,000, and more preferably 500 to 1,500.

As shown in FIG. 1, the complex catalyst supplied to the reactor 20, which is prepared in the complex catalyst preparation device 10, may be supplied to the reactor via a complex catalyst supply device 12 for adjusting supply of the complex catalyst, or be directly supplied to the reactor 20 from the complex catalyst preparation device 10 without the complex catalyst supply device 12.

Additionally, a process as follows may further be included as needed. In a neutralization and washing bath 22, a neutralization solution including water and a neutralizing agent (for example, sodium hydroxide) is added to a reactant released from the reactor 20 to remove a catalytic component from the reactant for neutralization and washing. A separation bath 24 into which the catalytic component-removed reactant is introduced, liquid-liquid separation into organic compound and water layers, i.e., hydro carbon and water layers is performed by using phase separation principle of water and oil. Therefore, a mixture in the water layer including the catalytic component is released and the organic compound which is remained after catalyst elimination in the reactant is supplied to a C4 distillation column 26. In the C4 distillation column 26, unreacted C4 in the organic compound is released and recovered through distillation, and the remaining organic compound is supplied to a LP (light polymer) distillation column 28. The LP distillation column 28, LP (light polymer) in the remaining organic compound is released and recovered through distillation, and remaining mid-reactive polybutene is stored in a product tank.

Hereinafter, the present invention will be described in more detail with reference to specific examples. The examples below are only to illustrate the present invention, and the present invention is not limited to the examples below. The molecular weight grade in the examples and comparative examples below is a target molecular weight for industrial production, and the molecular weight (Mn) value of the actual product may be a slightly different.

Example 1

Polymerization of Mid-Reactive Polybutene Having Molecular Weight of Grade 1,000

Polymerization was performed by continuously introducing a complex catalyst of normal propanol/boron trifluoride having a molar ratio of 1.1, which is prepared in a complex catalyst preparation device, and a raw reaction material having composition as described in Example 1 in Table 1 below (C4 raffinate-1), while maintaining the temperature of a reactor at −6° C. To allow the raw reaction material to maintain a liquid state, the pressure of the reactor was maintained at 3 kg/cm² or more. The average retention time was 45 minutes. In terms of the amount of used catalyst, 0.1 parts by weight of boron trifluoride was introduced with respect to 100 parts by weight of isobutene. After 180 minutes, the reactant released from the reactor was mixed with 5 wt % of a sodium hydroxide solution, and transferred to a neutralization and washing bath to terminate polymerization and remove the catalyst. Sequentially, the reactant was transferred to a separation bath to release and remove waste water including the catalyst. Then, the remaining reactant was introduced to a C4 distillation column. By heating the reactant at 100° C. in the C4 distillation column, C4 was released and recovered, and the remaining reactant was transferred to a LP distillation column. The reactant transferred to the LP distillation column was heated at 230° C. under 25 torr for 30 minutes of retention time to release and recover light polymer (LP) in the reactant. Remaining mid-reactive polybutene was transferred to a product tank and stored. The molecular weight of the prepared mid-reactive polybutene was measured through gel permeation chromatography (GPC), and vinylidene in polybutene was analyzed by using C13-NMR. As a result, the isobutene conversion rate was 94%, and the vinylidene content was 58%. In addition, the tetra-substituted double bond content was 23% (number average molecular weight (Mn)=980).

TABLE 1

| | | Raw reaction material (C4 raffinate-1) | | | | | |
|---|---|---|---|---|---|---|---|
| | cocatalyst | isobutane | n-butane | 1-butene | C-2-butene | T-2-butene | isobutene |
| Example 1 | a-propanol | 2.7 | 10.0 | 26.1 | 4.5 | 9.3 | 47.4 |
| Example 2 | a-propanol | 45.5 | 4.4 | 0.1 | 0.2 | — | 54.8 |
| Example 3 | a-propanol | 3.7 | 16.1 | 35.0 | 2.3 | 7.5 | 35.4 |
| Example 4 | a-propanol | 45.5 | 4.4 | 0.1 | 0.2 | — | 54.8 |
| Example 5 | a-propanol | 45.5 | 4.4 | 0.1 | 0.2 | — | 54.8 |
| Example 6 | a-propanol | 45.5 | 4.4 | 0.1 | 0.2 | — | 54.8 |
| Example 7 | a-propanol | 45.5 | 4.4 | 0.1 | 0.2 | — | 54.8 |
| Example 8 | a-propanol | 45.5 | 4.4 | 0.1 | 0.2 | — | 54.8 |
| Example 9 | a-propanol | 45.5 | 4.4 | 0.1 | 0.2 | — | 54.8 |
| Example 10 | a-propanol | 45.5 | 4.4 | 0.1 | 0.2 | — | 54.8 |
| Comparative Example 1 | methanol | 45.5 | 4.4 | 0.1 | 0.2 | — | 54.8 |
| Comparative Example 2 | isopropanol | 2.7 | 10.0 | 25.1 | 4.5 | 9.3 | 47.4 |
| Comparative Example 3 | ethanol | 3.7 | 16.1 | 35.0 | 2.3 | 7.5 | 35.4 |

Example 2

Polymerization of Mid-Reactive Polybutene Having Molecular Weight of Grade of 1,000

To obtain mid-reactive polybutene, polymerization was performed as described in Example 1 except that the reaction temperature was maintained at −6° C.; a raw reaction material having composition as described in Example 2 in Table 1 above (i.e., pure isobutylene) was used; and 0.08 parts by weight of boron trifluoride was introduced with respect to 100 parts by weight of isobutene. The isobutene conversion rate was 97%, and the vinylidene content was 63%. In addition, the tetra-substituted double bond content was 18% (number average molecular weight (Mn)=980).

Example 3

Polymerization of Mid-Reactive Polybutene Having Molecular Weight of Grade 1,000

To obtain mid-reactive polybutene, polymerization was performed as described in Example 1 except that the reaction temperature was maintained at −8° C.; a raw reaction material having composition as described in Example 3 in Table 1 above (i.e., butane-butene oil (B-B oil)) was used; and 0.17 parts by weight of boron trifluoride was introduced with respect to 100 parts by weight of isobutene. The isobutene conversion rate was 88%, and the vinylidene content was 56%. In addition, the tetra-substituted double bond content was 25% (number average molecular weight (Mn)=960).

Example 4

Polymerization of Mid-Reactive Polybutene Having Molecular Weight of Grade 550

To obtain mid-reactive polybutene, polymerization was performed as described in Example 1 except that the reaction temperature was maintained at −5° C.; a raw reaction material having composition as described in Example 4 in Table 1 above (i.e., pure isobutylene; which is the same as the raw reaction material used in Example 2) was used; and 0.081 parts by weight of boron trifluoride was introduced with respect to 100 parts by weight of isobutene. The isobutene conversion rate was 98%, and the vinylidene content was 66%. In addition, the tetra-substituted double bond content was 18% (number average molecular weight (Mn)=560).

Example 5

Polymerization of Mid-Reactive Polybutene Having Molecular Weight of Grade 550

To obtain mid-reactive polybutene, polymerization was performed as described in Example 1 except that the reaction temperature was maintained at −3° C.; a raw reaction material having composition as described in Example 5 in Table 1 above (i.e., pure isobutylene) was used; and 0.080 parts by weight of boron trifluoride was introduced with respect to 100 parts by weight of isobutene. The isobutene conversion rate was 98%, and the vinylidene content was 64%. In addition, the tetra-substituted double bond content was 22% (number average molecular weight (Mn)=540).

Example 6

Polymerization of Mid-Reactive Polybutene Having Molecular Weight of Grade 550

To obtain mid-reactive polybutene, polymerization was performed as described in Example 1 except that the reaction temperature was maintained at −2° C.; a raw reaction material having composition as described in Example 6 in Table 1 above (i.e., pure isobutylene) was used; and 0.080 parts by weight of boron trifluoride was introduced with respect to 100 parts by weight of isobutene. The isobutene conversion rate was 98%, and the vinylidene content was 63%. In addition, the tetra-substituted double bond content was 21% (number average molecular weight (Mn)=560).

Example 7

Polymerization of Mid-Reactive Polybutene Having Molecular Weight of Grade 550

To obtain mid-reactive polybutene, polymerization was performed as described in Example 1 except that the reaction temperature was maintained at 0° C.; a raw reaction material having composition as described in Example 7 in Table 1 above (i.e., pure isobutylene) was used; and 0.079 parts by weight of boron trifluoride was introduced with respect to 100 parts by weight of isobutene. The isobutene conversion rate was 98%, and the vinylidene content was 60%. In addition, the tetra-substituted double bond content was 23% (number average molecular weight (Mn)=530).

Example 8

Polymerization of Mid-Reactive Polybutene Having Molecular Weight of Grade 550

To obtain mid-reactive polybutene, polymerization was performed as described in Example 1 except that the reaction temperature was maintained at 2° C.; a raw reaction material having composition as described in Example 8 in Table 1 above (i.e., pure isobutylene) was used; and 0.078 parts by weight of boron trifluoride was introduced with respect to 100 parts by weight of isobutene. The isobutene conversion rate was 98%, and the vinylidene content was 56%. In addition, the tetra-substituted double bond content was 24% (number average molecular weight (Mn)=540).

Example 9

Polymerization of Mid-Reactive Polybutene Having Molecular Weight of Grade 550

To obtain mid-reactive polybutene, polymerization was performed as described in Example 1 except that the reaction temperature was maintained at 3° C.; a raw reaction material having composition as described in Example 9 in Table 1 above (i.e., pure isobutylene) was used; and 0.078 parts by weight of boron trifluoride was introduced with respect to 100 parts by weight of isobutene. The isobutene conversion rate was 98%, and the vinylidene content was 53%. In addition, the tetra-substituted double bond content was 25% (number average molecular weight (Mn)=550).

Example 10

Polymerization of Mid-Reactive Polybutene Having Molecular Weight of Grade 550

To obtain mid-reactive polybutene, polymerization was performed as described in Example 1 except that the reaction temperature was maintained at 5° C.; a raw reaction material having composition as described in Example 10 in Table 1 above (i.e., pure isobutylene) was used; and 0.077 parts by weight of boron trifluoride was introduced with respect to 100 parts by weight of isobutene. The isobutene conversion rate was 98%, and the vinylidene content was 45%. In addition, the tetra-substituted double bond content was 25% (number average molecular weight (Mn)=550).

Comparative Example 1

Polymerization of Mid-Reactive Polybutene Having Molecular Weight of Grade 1,000

To obtain mid-reactive polybutene, polymerization was performed as described in Example 2 except that a raw reaction material having composition the same as that of Example 4 (i.e. pure isobutylene) was used; a complex catalyst of methanol/boron trifluoride having a molar ratio of 1.1 and prepared in a complex catalyst preparation device was used; and the reaction temperature was maintained at 17° C. to adjust the vinylidene content. The isobutene conversion rate of was 97%, and the vinylidene content was 60%. In addition, the tetra-substituted double bond content was 25% (number average molecular weight (Mn)=330). Due to too high vinylidene content, when decreasing the vinylidene content (by increasing the reaction temperature), the molecular weight was decreased too much so that preparation of polybutene having a desired molecular weight (1,000) was unavailable.

Comparative Example 2

Polymerization of Mid-Reactive Polybutene Having Molecular Weight of Grade 1,000

To obtain mid-reactive polybutene, polymerization was performed as described in Example 1 except that a raw reaction material having composition the same as that of Comparative Example 2 in Table 1 above (i.e. C4 raffinate-1 which was the same as the raw reaction material used in Example 1) was used; a complex catalyst of isopropanol/boron trifluoride having a molar ratio of 1.1 and prepared in a complex catalyst preparation device was used; and the reaction temperature was maintained at 13° C. to adjust the vinylidene content. The isobutene conversion rate of was 94%, and the vinylidene content was 59%. In addition, the tetra-substituted double bond content was 21% (number average molecular weight (Mn)=370). Since the activity of the catalyst was decreased due to 1-butene in the raw reaction material, preparation of mid-reactive polybutene having a high molecular weight (1,000) was unavailable.

Comparative Example 3

Polymerization of Mid-Reactive Polybutene Having Molecular Weight of Grade 1,000

To obtain mid-reactive polybutene, polymerization was performed as described in Example 3 except that a raw reaction material having composition as described in Comparative Example 3 in Table 1 above was used; a complex catalyst of ethanol/boron trifluoride having a molar ratio of 1.1 and prepared in a complex catalyst preparation device was used; and the reaction temperature was maintained at 7° C. to adjust the vinylidene content. The isobutene conversion rate of was 88%, and the vinylidene content was 58%. In addition, the tetra-substituted double bond content was 19% (number average molecular weight (Mn)=500). In Comparative Example 3, the molecular weight was decreased too much when adjusting the vinylidene content so that preparation of mid-reactive polybutene having a desired molecular weight (1,000) was unavailable. Like Comparative Example 2, due to 1-butene in the raw reaction material, the activity of the catalyst was decreased so that mid-reactive polybutene having a high molecular weight (1,000) was unavailable.

Table 2 below shows physical properties and reaction conditions of polybutene prepared in Examples 1 to 10 and Comparative Examples 1 to 3 described above.

TABLE 2

| | Isobutene conversion rate (%) | Catalyst (wt %) | reaction temperature (° C.) | Vinylidene amount (%)/tetra-substituted double bond amount (%) | Molecular weight of grade (grade) | MN |
|---|---|---|---|---|---|---|
| Example 1 | 94 | 0.1 | −6 | 58/23 | 1000 | 980 |
| Example 2 | 97 | 0.08 | −6 | 63/18 | 1000 | 980 |
| Example 3 | 88 | 0.17 | −8 | 56/25 | 1000 | 960 |
| Example 4 | 98 | 0.081 | −5 | 66/18 | 550 | 560 |
| Example 5 | 98 | 0.080 | −3 | 64/22 | 550 | 540 |
| Example 6 | 98 | 0.080 | −2 | 63/21 | 550 | 560 |
| Example 7 | 98 | 0.079 | 0 | 60/23 | 550 | 530 |
| Example 8 | 98 | 0.078 | 2 | 56/24 | 550 | 540 |
| Example 9 | 98 | 0.078 | 3 | 53/25 | 550 | 550 |
| Example 10 | 98 | 0.077 | 5 | 45/25 | 550 | 550 |
| Comparative Example 1 | 97 | 0.08 | 17 | 60/25 | 1000 | 330 |
| Comparative Example 2 | 94 | 0.1 | 13 | 59/21 | 1000 | 370 |
| Comparative Example 3 | 88 | 0.17 | 7 | 58/19 | 1000 | 500 |

As shown in Tables 1 and 2 above, it can be found that mid-reactive polybutene having a mid-range vinylidene content may be prepared even when any type of raw reaction material is supplied during the operation of a plant for polybutene preparation according to the method for preparing polybutene by using a catalyst including normal propanol according to the present invention. In other word, even in the case where 3 types of raw reaction materials used in Examples 1 to 10 or a C4 raw material having various compositions is supplied, mid-reactive polybutene may be prepared by adjusting introduction quantity of the catalyst and temperature, thereby easily adjusting vinylidene and the molecular weight.

Namely, the method for preparing polybutene using a catalyst including normal propanol according to the present invention may adjust the vinylidene content by adjusting the reaction temperature. The results shown in Table 3 below were obtained through the repetitive experiments.

TABLE 3

| | reaction temperature (° C.) | Reaction temperature variation(|T|) | Vinylidene amount (%) | Vinylidene amount variation(|ΔV|) |
|---|---|---|---|---|
| Example 4 [(1) in FIG. 2] | −5 | 5 | 66 | 6 |
| Example 5 [(2) in FIG. 2] [ | −3 | 3 | 64 | 4 |
| Example 6 [(3) in FIG. 2] | −2 | 2 | 63 | 3 |
| Example 7 | 0 | — | 60 | — |
| Example 8 [(4) in FIG. 2] | 2 | 2 | 56 | 4 |
| Example 9 [(5) in FIG. 2] | 3 | 3 | 53 | 7 |
| Example 10 [(1) in FIG. 2] | 5 | 5 | 45 | 15 |

As shown in Table 3 above and FIG. 2 below, it can be found that the vinylidene content was distributed in a certain range depending on the reaction temperature. For example, when the reaction temperature was changed by 5° C. based on 0° C. (−5° C. and 5° C.), although the increased and decreased amounts of the vinylidene content were different (for −5° C., the vinylidene content was increased to 66%, and, for 5° C., the vinylidene content was decreased to 45%), the variation thereof was included in the range of the Formula 1 ($1.2 \times |T| \leq \Delta V \leq 3 \times |T|$) above.

Further, for Comparative Examples 1 to 3, high purity isobutene, raffinate-1, and butane-butene oil are respectively used with a typical alcohol cocatalyst without normal propanol. In that case, to adjust the vinylidene content to a descried content, the reaction temperature should be greatly increased during polymerization. For that case, the vinylidene content is adjusted, however the molecular weight is deceased too much so that preparation of mid-reactive polybutene having a desired polybutene content of 40 to 70% becomes difficult. Generally, the high molecular weight is obtained at a low temperature, and a low molecular weight is obtained at a high temperature. Also, 1-butene decreases the vinylidene content, and the activity of the catalyst, so that the molecular weight was decreased. However, as the polymerization temperature decreases, the amount of deceased vinylidene content and molecular weight due to the influence of 1-butene is reduced. Therefore, when polybutene is polymerized at a relatively low temperature, the vinylidene content may be easily adjusted and mid-reactive polybutene having a desired molecular weight may be prepared.

When the complex catalyst including a normal propanol cocatalyst and a main catalyst such as boron trifluoride of the present invention is used, the vinylidene content included in polybutene may be adjusted. In addition to the property in that, when the reaction temperature is increased, the vinylidene content is decreased and, when the reaction temperature is reduced, the vinylidene content is increased, polybutene having a high molecular weight with respect to the typical complex catalyst (main catalyst/cocatalyst) may be prepared. Further, when the normal propanol cocatalyst is used, unlike the typical alcohol cocatalyst, yield of a liquid phase polymer product may be enhanced even when the isobutene conversion rate is increased.

As described above, according to the method for preparing polybutene by using a catalyst including normal propanol according to the present invention, both production efficiency and quality may be satisfied, so that preparation of a competitive product may be prepared by reducing production cost. In addition, unless a polybutene manufacturing company prepares a raw material by itself and uses, the raw material is generally supplied by a raw material manufacturing company so that supply of the raw material may be difficult. However, by using the method for preparing polybutene according to the present invention, even in the case where a certain raw material is not provided, a product may be easily prepared. Further, preparation may be efficient relative to typical preparation of highly reactive polybutene, because a product may be prepared by adjusting the reaction temperature depending on the molecular weight and isobutene concentration after the reaction, and preparation was performed at room temperature due to highly active complex catalyst including normal propanol.

The method for preparing polybutene using a catalyst including normal propanol according to the present invention facilitates adjustment of the vinylidene content and molecular weight, thereby allowing mid-reactive polybutene to be prepared at a high conversion rate and yield. In the method, even though any type of raw material including an economical C4 mixture such as C4 raffinate-1 having low cost, an isobutene mixture, or high purity isobutene having relatively high cost is supplied, the vinylidene content in polybutene may be adjusted to 40 to 70%, so that preparation of polybutene is economical. In addition, by including 10% or more tetra-substituted double bond in polybutene, compatibility with lubricating oil or fuel of an internal combustion engine, as well as heat stability and reactivity are increased.

The invention claimed is:

1. A method for preparing polybutene having 40 to 70% of vinylidene content and 10% or more of tetra-substituted double bond content, the method comprising:
   introducing, to a raw reaction material including 10 wt % or more of isobutene, a complex catalyst, including normal propanol as a cocatalyst and boron trifluoride as a main catalyst in a molar ratio of normal propanol/boron trifluoride of 1 to 1.5; and
   polymerizing the raw reaction material at a reaction temperature of −33 to 33° C. under a reaction pressure of 3 to 50 kg/cm$^2$, wherein the vinylidene content is adjusted by adjusting the reaction temperature;
   wherein the vinylidene content is adjusted by adjusting the reaction temperature according to Formula 1:

$$1.2 \times |T| \leq \Delta V \leq 3 \times |T| \qquad \text{[Formula 1]}$$

wherein,
   T represents the reaction temperature; |T| represents variation of the reaction temperature based on a reaction temperature of 0° C.; and ΔV represents variation of the vinylidene content.

2. The method for preparing polybutene of claim 1, wherein the boron trifluoride is 0.02 to 1 parts by weight with respect to 100 parts by weight of isobutene.

3. The method for preparing polybutene of claim 1, wherein the polymerization is carried out for 5 to 100 minutes.

4. The method for preparing polybutene of claim 1, wherein for adjusting terminal vinylidene, the isobutene conversion rate is 80% or more.

5. The method for preparing polybutene of claim 1, wherein a number average molecular weight of polybutene is 300 to 5,000.

* * * * *